US011863522B2

United States Patent
Filsfils et al.

(10) Patent No.: US 11,863,522 B2
(45) Date of Patent: Jan. 2, 2024

(54) APPLYING ATTESTATION TO THE BORDER GATEWAY PROTOCOL (BGP)

(71) Applicant: Cisco Technology, Inc., San Jose, CA (US)

(72) Inventors: Clarence Filsfils, Brussels (BE); Swadesh Agrawal, Fremont, CA (US); Apoorva Karan, San Ramon, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 118 days.

(21) Appl. No.: 16/825,068

(22) Filed: Mar. 20, 2020

(65) Prior Publication Data

US 2020/0322310 A1 Oct. 8, 2020

Related U.S. Application Data

(60) Provisional application No. 62/829,486, filed on Apr. 4, 2019.

(51) Int. Cl.
*H04L 9/40* (2022.01)
*G06F 21/60* (2013.01)

(52) U.S. Cl.
CPC ........ *H04L 63/0209* (2013.01); *G06F 21/602* (2013.01)

(58) Field of Classification Search
CPC ............................ H04L 63/0209; G06F 21/602
See application file for complete search history.

(56) References Cited

U.S. PATENT DOCUMENTS

| | | | |
|---|---|---|---|
| 9,455,992 B2* | 9/2016 | Douceur | H04L 63/123 |
| 9,654,503 B1* | 5/2017 | Kowalyshyn | H04L 63/1425 |
| 10,594,592 B1* | 3/2020 | Wang | H04L 45/22 |
| 2005/0047412 A1* | 3/2005 | Hares | H04L 45/04 370/392 |
| 2005/0213768 A1* | 9/2005 | Durham | H04L 63/062 380/278 |
| 2007/0297405 A1 | 12/2007 | He | |
| 2009/0086977 A1* | 4/2009 | Berggren | H04L 9/3263 380/279 |
| 2012/0265984 A1* | 10/2012 | Ramanujan | H04L 63/08 713/156 |
| 2014/0115325 A1* | 4/2014 | Detienne | H04L 63/0428 713/160 |
| 2015/0341428 A1* | 11/2015 | Chauhan | H04L 67/42 709/203 |

(Continued)

OTHER PUBLICATIONS

PCT Notification of Transmittal of the Intl. Search Report and the Written Opinion of the Intl. Searching Authority, or the Declaration, re PCT/US2020/026507, dated Jul. 21, 2020.

(Continued)

*Primary Examiner* — Noura Zoubair
*Assistant Examiner* — Zoha Piyadehghibi Tafaghodi
(74) *Attorney, Agent, or Firm* — Baker Botts L.L.P.

(57) ABSTRACT

In one embodiment, a method by an apparatus of a Border Gateway Protocol (BGP) network includes accessing an attestation token for the apparatus. The method further includes encoding the attestation token in a BGP signaling message. The method further includes sending the BGP signaling message with the encoded attestation token to a second apparatus of the BGP network.

18 Claims, 5 Drawing Sheets

(56) References Cited

U.S. PATENT DOCUMENTS

| | | | |
|---|---|---|---|
| 2016/0080502 A1* | 3/2016 | Yadav | H04L 47/22 |
| | | | 709/227 |
| 2017/0353430 A1* | 12/2017 | Holtmanns | H04L 67/145 |
| 2018/0109450 A1* | 4/2018 | Filsfils | H04L 45/74 |
| 2018/0367449 A1* | 12/2018 | Pani | H04L 41/40 |
| 2019/0058709 A1* | 2/2019 | Kempf | H04L 9/3239 |

OTHER PUBLICATIONS

Qi Li et al., "Enhancing the Trust of Internet Routing with Lightweight Route Attestation," *IEEE Transactions on Information Forensics and Security*, vol. 7, No. 2, pp. 691-703, Apr. 2012.
J. Durand et al., "BGP Operations and Security," IETF, Request for Comments 7454, BCP 194, Category: Best Current Practice, ISSN: 2070-1721 (26 pages), Feb. 2015.
M. Lepinski et al., An Infrastructure to Support Secure Internet Routing draft-ietf-sidr-arch-10.txt. Secure Inter-Domain Routing, Working Group, Internet Draft, Intended status: Informational, Expires Mar. 21, 2011 (25 pages), Sep. 21, 2010.
S. Kent et al., "Threat Model for BGP Path Security," IETF, Request for Comments: 7132; Category: Informational; ISSN: 2070-1721 (20 pages), Feb. 2014.
Kevin Butler, et al., "A Survey of BGP Security Issues and Solutions," *Proceedings of the IEEE*, vol. 98, No. 1, Jan. 2020.
Michael J. Ham, "BGP Route Attestation: Design and Observation Using IPV6," hhtps://scholar.dsu.edu/theses/308, Spring Mar. 1, 2017.
*The Internet Protocol Journal*, vol. 6, No. 3, Sep. 2003.

* cited by examiner

FIG. 1

Open Message (150a)

| Octets | 16 | 2 | 1 | 2 | 2 | 4 | 1 | 7 |
|---|---|---|---|---|---|---|---|---|
| | Marker | Length | Type | Version | AS | Hold Time | BGP ID | Optional Length | Optional |

*FIG. 2A*

Update Message (150b)

| Octets | 16 | 2 | 1 | 2 | Variable | 2 | Variable | Variable |
|---|---|---|---|---|---|---|---|---|
| | Marker | Length | Type | Unfeasible Routes Length | Withdrawn Routes | Attribute Length | Attributes | NLR1 |

*FIG. 2B*

Notification Message (150c)

| Octets | 16 | 2 | 1 | 1 | 1 | Variable |
|---|---|---|---|---|---|---|
| | Marker | Length | Type | Error Code | Error Sub-code | Diagnostic Data |

*FIG. 2C*

Keepalive Message (150d)

| Octets | 16 | 2 | 1 |
|---|---|---|---|
| | Marker | Length | Type |

APPLYING ATTESTATION TO THE BORDER GATEWAY PROTOCOL (BGP)

PRIORITY

This application claims the benefit, under 35 U.S.C. § 119(e), of U.S. Provisional Patent Application No. 62/829,486, filed 4 Apr. 2019, which is incorporated herein by reference in its entirety.

TECHNICAL FIELD

The present disclosure relates generally to data communications, and more particularly to applying attestation to the Border Gateway Protocol (BGP) routing protocol.

BACKGROUND

In a network, information may be transmitted through one or more network nodes before arriving at its destination. Certain network nodes may be become compromised. For example, an attacker may gain control of a node and direct traffic from the node to the attacker's computing device. In the event the attacker gains access to one or more network nodes, the attacker may tamper with the sensitive information transmitted through the compromised node.

DESCRIPTION OF EXAMPLE EMBODIMENTS

Overview

In a communications network, information may be transmitted through one or more network nodes before arriving at its destination. In some networks, the Border Gateway Protocol (BGP) routing protocol is utilized between certain network nodes to transmit information. More specifically, BGP is used to exchange routing and reachability information among autonomous systems (AS) on a network such as the Internet.

In some situations, certain network nodes in a BGP network may become compromised. For example, an attacker may gain control of a node and direct traffic from the node to the attacker's computing device. In the event the attacker gains access to one or more network nodes, the attacker may tamper with the sensitive information transmitted through the compromised node.

Example Embodiments

To address these and other problems in networks that utilize BGP, embodiments of the disclosure provide apparatuses, systems, methods, and computer-readable media for applying attestation to BGP. In some embodiments, the attestation that is applied to BGP includes a token which may allow external entities to validate freshness of asserted data based on the state of internal counters within a Trusted Platform Module (TPM). The token or signed measurement may be referred as a canary stamp (or simply "Stamp") since a token or signed measurement may provide authenticity similar to a stamp and may be used as an early indicator of trouble. In some embodiments, the attestation is applied to a BGP keepalive message by appending the canary stamp to the end of a typical BGP keepalive message. In some embodiments, the attestation is applied to a BGP update message by appending the canary stamp to a new attribute of a BGP update message. In both cases, the canary stamps may be transmitted to other network entities where they may be analyzed in order to determine whether the attesting node has been compromised.

Figure 1:
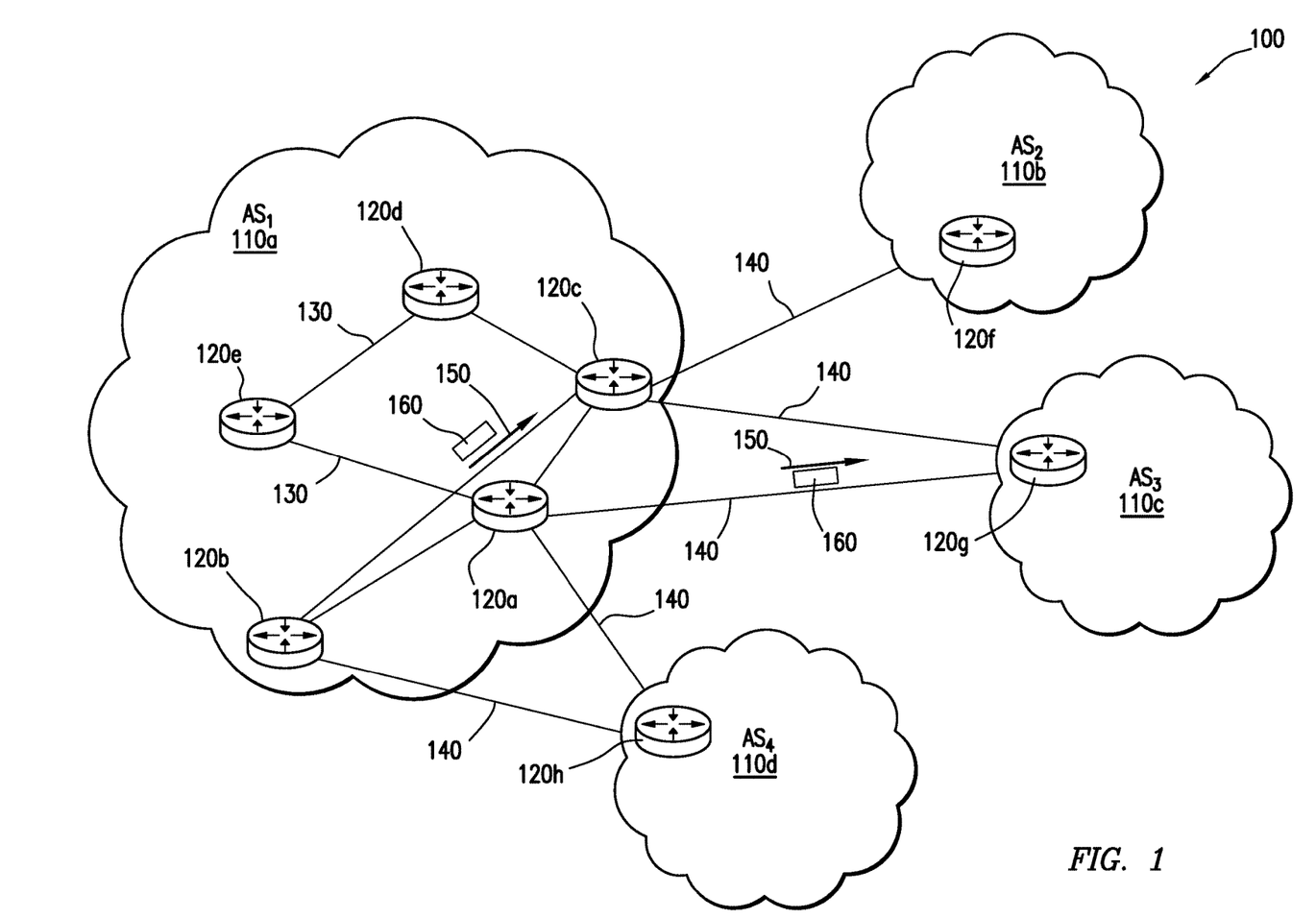
FIG. 1 illustrates a network utilizing the Border Gateway Protocol (BOP) routing protocol, according to certain embodiments.
Figure 3A:
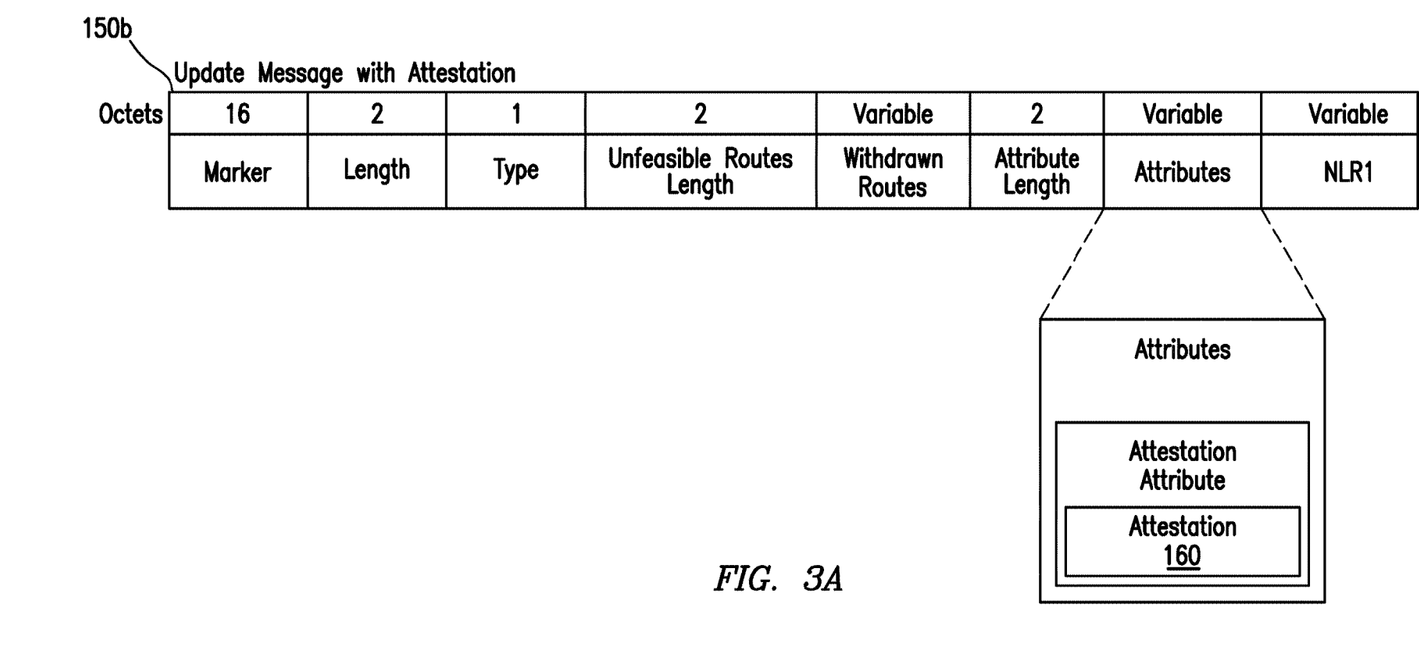
FIGS. 3A and 3B illustrate example BOP signaling messages with added attestation, according to certain embodiments.
Figure 3B:
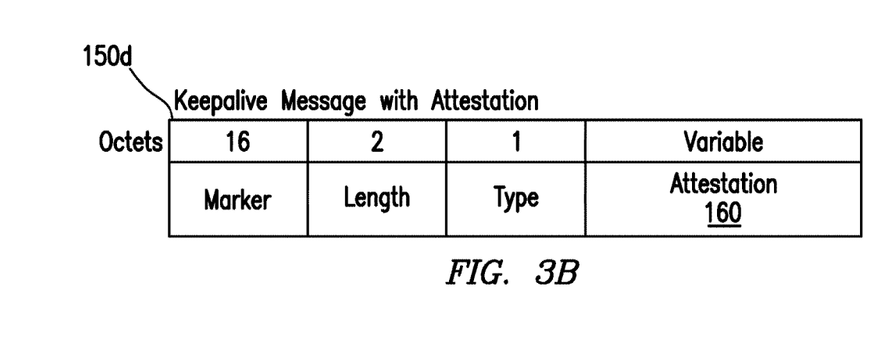
Figure 4:
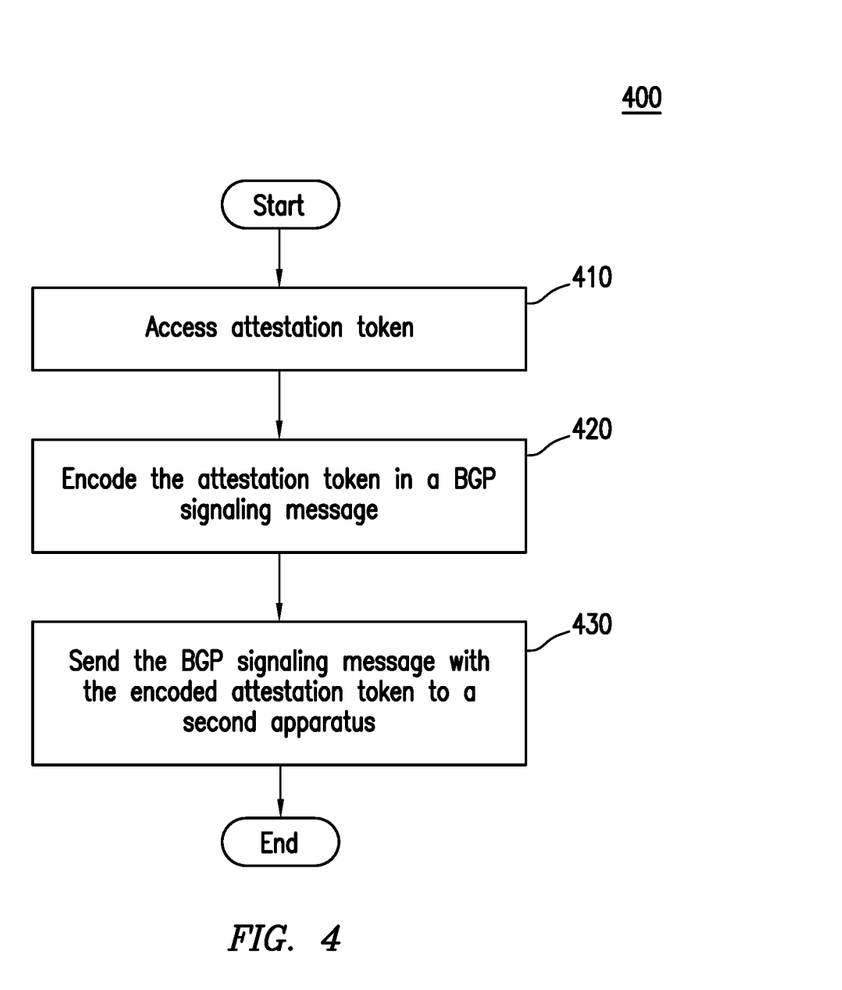
FIG. 4 illustrates an example method for applying attestation to BGP, according to certain embodiments.
Figure 5:
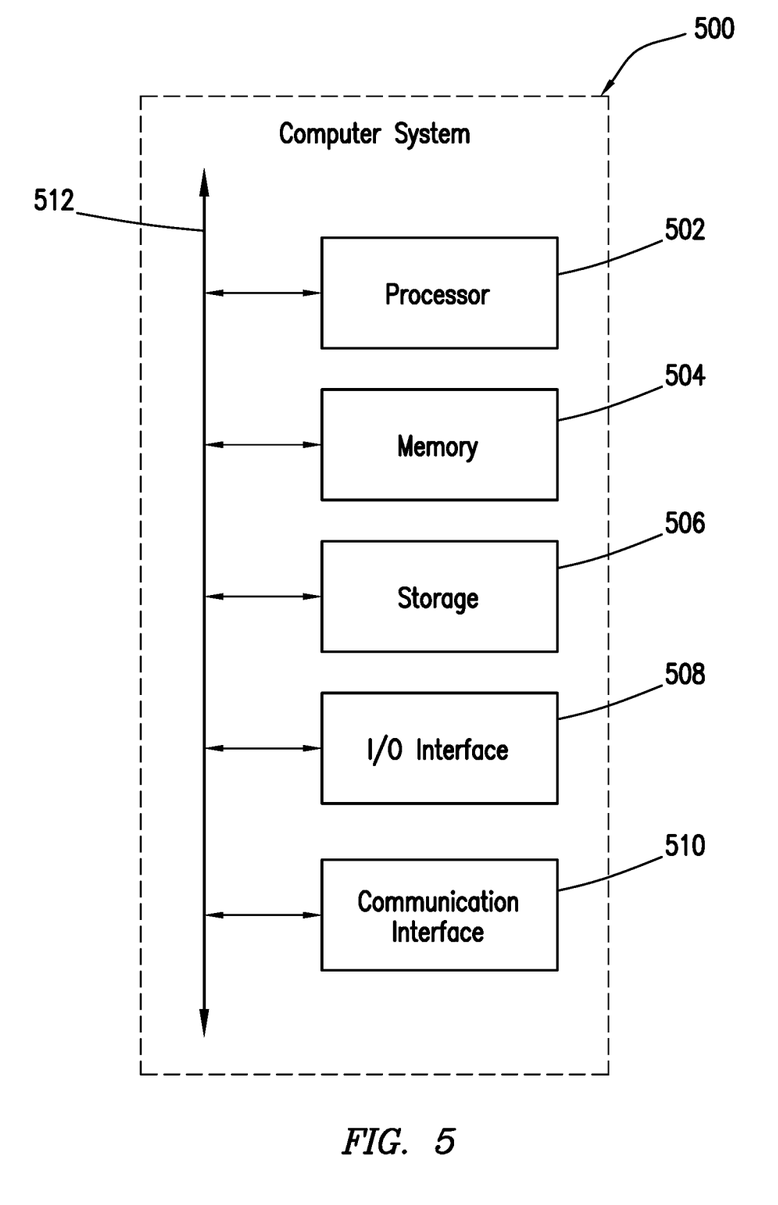
FIG. 5 illustrates an example computer system, according to certain embodiments.

The advantages and features of certain embodiments are discussed in more detail below in reference to FIGS. 1-5. FIG. 1 illustrates a network utilizing the Border Gateway Protocol (BGP) routing protocol. FIGS. 2A-2D illustrate example BGP signaling messages. FIGS. 3A and 3B illustrate example BGP signaling messages with added attestation. FIG. 4 illustrates an example method for applying attestation to BGP. FIG. 5 illustrates an example computer system.

FIG. 1 illustrates a network 100 that utilizes BGP, according to certain embodiments. Network 100 includes multiple network elements 120 (e.g., 120a-h) and multiple routing domains or autonomous systems (e.g., ASes 110a-d). ASes 110a-d are interconnected by edge network nodes 120 (e.g., 120a-c and 120f-g). Network elements 120 may be switches, routers, or any other appropriate network elements. ASes 110 are illustratively interconnected by edge network elements 120a-c and 120f-g via point-to-point communication links 140, such as frame relay links, asynchronous transfer mode links or other serial links. The edge network elements 120a-c of AS 110a are illustratively coupled to network elements 120d-e via subnetworks, such as local area networks 130. Communication among network elements 120 is typically effected by exchanging discrete data packets or messages in accordance with predefined protocols, such as the Transmission Control Protocol/Internet Protocol (TCP/IP). It will be understood to those skilled in the art that other protocols, such as the Internet Packet Exchange (IPX) protocol, may be advantageously used with the disclosed embodiments.

Routing decisions within each AS 110 may rely on a predetermined "interior" gateway routing protocol (IGP). An example of an IGP is a conventional link-state protocol, such as the Open Shortest Path First (OSPF) or Intermediate-System-to-Intermediate-System (ISIS) protocol. In addition, routing information may be exchanged among the ASes 110a-d using an "exterior" gateway protocol (EGP), such as BGP. To that end, the BGP-enabled network elements 120 (i.e., "BGP speakers") exchange routing information with other BGP speakers that are not in the same AS 110 (e.g., 120f-h) using an external form of BGP (eBGP), while BGP-enabled network elements 120a-c within the same AS 110 exchange routing information with each other using an internal form of BGP (iBGP). BOP-enabled network elements 120 communicate information to other BGP-enabled network elements 120 using a BGP signaling message 150. BOP signaling messages 150 may include an attestation 160, as described in more detail below.

In general, BGP-enabled network elements 120 (e.g., network elements 120a-c and 120f-h in FIG. 1) apply attestation 160 to signaling messages 150 that are transmitted to other BOP-enabled network elements 120 (e.g., external BGP peers). Attestation 160 provides verifiable evidence of the trustworthiness of network elements 120, thereby enabling external devices to ascertain if any network element 120 has been compromised (e.g., hacked or captured). This increases the security of network 100 and reduces or eliminates the possibility of sensitive information being stolen.

Figures 2A, 2B, 2C, 2D:
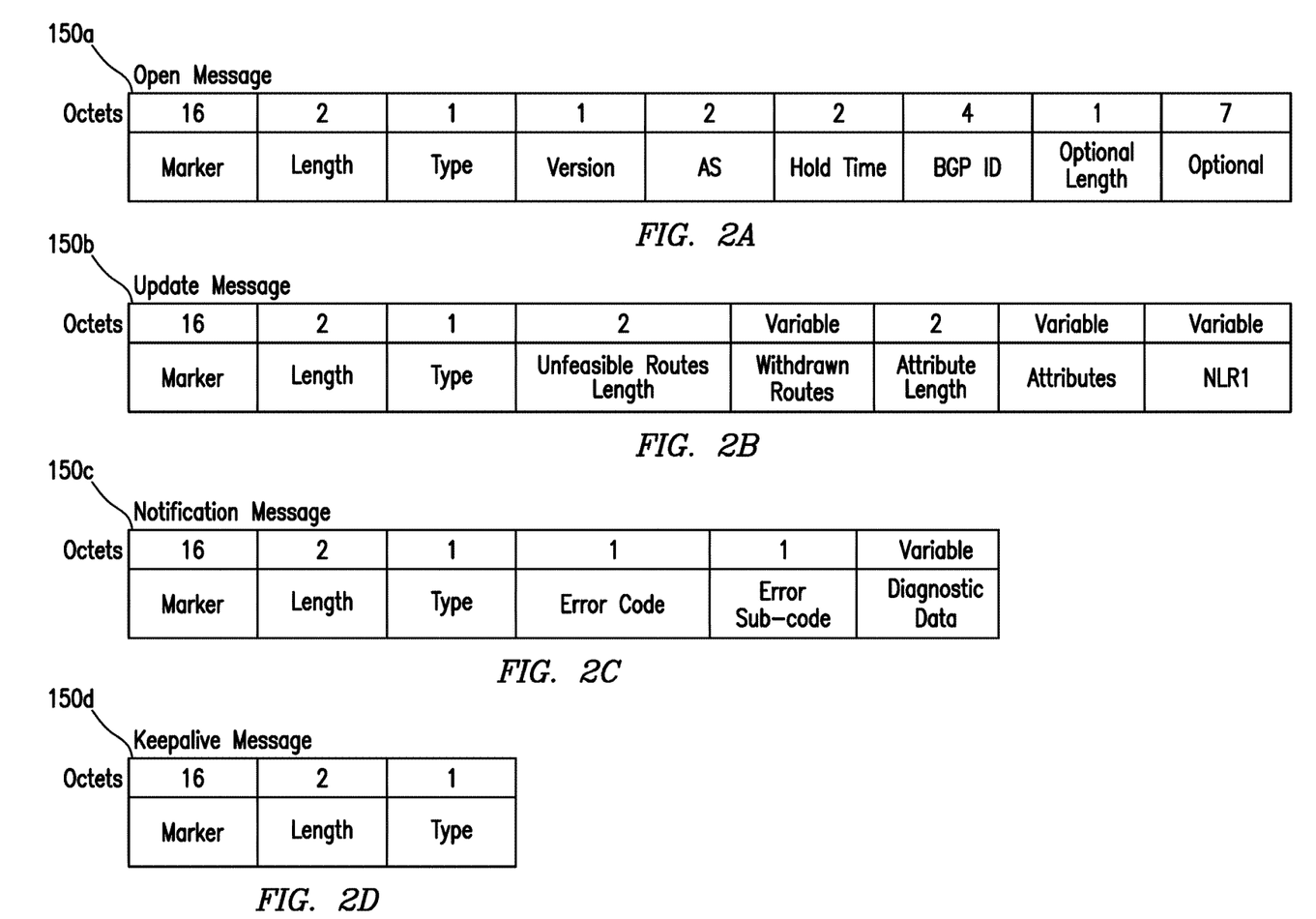
FIGS. 2A-2D illustrate example BGP signaling messages, according to certain embodiments.

FIGS. 2A-2D illustrate typical BGP signaling messages 150a-d, according to certain embodiments. In FIG. 2A, a BGP open message 150a is illustrated. BGP open message 150a has a type code of "1". BGP open message 150a is the first message that is sent by both peers (e.g., network elements 120c and 120f) after a connection (e.g., a TCP connection) has been established. If BGP open message 150a is acceptable to a network element 120, a BGP keepalive message 150d is sent to confirm the BGP open message 150a. BGP keepalive message 150d, BGP update message 150b, and BGP notification message 150c can be exchanged only after BGP open message 150a has been confirmed and the BGP connection had been established. As illustrated in FIG. 2A, BGP open message 150a includes the following fields: a marker field (16 octets), a length field (2 octets), a type field (1 octet), a version field (1 octet), an AS field (2 octets), a hold time field (2 octets), a BGP ID field (4 octets), an optional length field (octet), and an optional field (7 octets).

In FIG. 2B, a BGP update message 150b is illustrated. BGP update message 150b has a type code of "2". BGP update message 150b is exchanged between network elements 120 to communicate incremental changes in a routing table. BGP update message 150b includes the following fields: a marker field (16 octets), a length field (2 octets), a type field (1 octet), an unfeasible routes length field (2 octets), a withdrawn routes field (variable), an attribute length field (2 octets), an attributes field (variable), and NLRI field (variable). As discussed in more detail below in reference to FIG. 3A, the attributes field of BGP update message 150b may be used to transport attestation 160 in certain embodiments.

In FIG. 2C, a BGP notification message 150c is illustrated. BGP notification message 150c has a type code of "3". BGP notification message 150c is sent when an error or a special condition is detected. The BGP connection is terminated immediately when a BGP notification message 150c is sent. BGP notification message 150c includes the following fields: a marker field (16 octets), a length field (2 octets), a type field (I octet), an error code field (1 octet), an error sub-code field (1 octet), and a diagnostic data field (variable).

In FIG. 2D, a BGP keepalive message 150d is illustrated. BGP keepalive message 150d has a type code of "4". BGP keepalive message 150d maintains the BGP connection between two BGP peers. BOP keepalive message 150d is exchanged on a period of one-third of the hold time, but not less than one second (60 seconds by default). BGP keepalive message 150d includes the following fields: a marker field (16 octet), a length field (2 octets), and a type field (1 octet). As discussed in more detail below in reference to FIG. 3B, BGP keepalive message 150d may include additional fields that may be used to transport attestation 160 in certain embodiments.

FIGS. 3A and 3B illustrate novel BGP signaling messages 150 that may be used to apply attestation to BGP. FIG. 3A illustrates a BGP update message 150b with added attestation 160, and FIG. 3B illustrates a BOP keepalive message 150d with added attestation 160, according to certain embodiments. As illustrated in FIG. 3A, attestation 160 may be added to a typical BGP update message 150b using the attributes field of BGP update message 150b. As illustrated in FIG. 3B, attestation 160 may be added to a typical BGP keepalive message 150d by appending attestation 160 to the end of a BGP keepalive message 150d.

In general, BGP update message 150b with added attestation 160 and BGP keepalive message 150d with added attestation 160 may be utilized by network elements 120 (e.g., BGP-enabled network elements 120a-c) to apply attestation to BGP. In some embodiments, the attestation 160 that is applied to BGP includes a token which may allow external entities to validate freshness of asserted data based on the state of internal counters within a TPM. In some embodiments, the attestation is provided by a TPM. Dedicated crypto-processors, such as a TPM, may take measurements necessary to attest the identity of a device and running binaries on the device. These measurements may include evidence that the device is in a known safe state. However, a receiver must be able to certify the evidence as fresh. Without a guarantee of freshness, an attacker may have an opening to inject previously recorded measurements, asserting what is replayed as being current. When sensitive information is being transmitted to a destination device through a network, network traffic should not be sent through comprised network nodes (e.g., hacked or captured nodes) to prevent leakage of or tampering with the sensitive information. However, traditional protections and link encryption are ineffectual to ensure that each router in the end to end path is not compromised specially when an attacker gains root access to a device via some exploit.

In particular embodiments, a first network node (e.g., a network element 120 acting as a BGP speaker such as edge network element 120f) may be configured to communicate using the BGP routing protocol. The first network node may receive a BGP signaling message (e.g., a BGP update message 150b or a BGP keepalive message 150d) that includes an attestation token 160 from a second network node (e.g., edge network element 120a). The attestation token 160 may be for proving that the second network node is in a known safe state. The first network node may determine that the attestation token is valid for the second network node at a current time. The first network node may compute a trust level for the second network node based at least on the received attestation token 160. The trust level for the second network node may be used by the network nodes in the network to compute a routing table of the network. For example, if an attestation token 160 for a particular network node indicates that the particular network node has been compromised, the routing table of the network may be updated to avoid sending traffic through the compromised node.

As described herein, verifiable evidence of device tampering (e.g., canary stamps) may be appended to interactions based on existing communication protocols. This may give evidence receivers the option of evaluating trustworthiness of the network device and reacting accordingly. For example, the evidence receiver may determine that it no longer trusts the network device and adjusts network policy to mitigate possible damage or potential security threats. Dedicated crypto-processors such as a TPM may take necessary measurements to attest the identity of a device and its running binaries. These measurements may include detecting evidence which indicates that the device is in a known safe state. However, a receiver may need to certify the evidence as fresh because, without a guarantee of freshness, an attacker may inject previously recorded measurements to make the receiver to assert what is replayed as being current.

Traditional systems and methods may identify or detect the replaying of old evidence via a nonce. For example, a nonce could be a random number provided by the entity making the request. This nonce may be passed into the TPM which may generate results including a signature based on the nonce which could not have been generated without providing that nonce. However, the nonce-based method may rely on the transactional challenge/response interaction model. In other words, the nonce-based method may not work with unidirectional communications originating from the attesting device. For example, a nonce may not work with an asynchronous push, multicast, broadcast messages, etc.

Particular embodiments of this disclosure may perform a unidirectional attestation which is applicable to, for example, an asynchronous push, multicast, broadcast messages, etc., for the authentication of the corresponding devices in conjunction with corresponding binaries. Particular embodiments may enable a communication platform to assess whether the peer platforms are trustworthy. For example, the system may perform a detection of invalid attestations that can trigger alarms/events reduction of network access from a suspect device or can become a part of Admission Control (e.g., IEEE 802.1X). The communication platforms may be capable of supporting the unidirectional attestation mechanism. As an alternative approach for attesting freshness, particular embodiments of the system may generate a token which may allow external entities to validate freshness of asserted data based on the state of internal counters within the TPM. The token may allow the replay attacks to be detected without a nonce and make it possible for the attestation for asynchronous push, multicast, broadcast, etc. The token or signed measurement may be referred as a canary stamp since a token or signed measurement may provide authenticity like a stamp and may be used as an indicator of an early sign of trouble. Particular embodiments of the system may combine the token or signed measurement with TPM-integrated capabilities aimed at verifying that valid binary processes are running. The TPM-integrated capabilities may include, for example, but are not limited to, trusted execution environments (TEE) which may provide runtime malware protections and authenticated code modules (ACM) which may ensure that only digitally signed code modules can be loaded into a CPU. Particular embodiments of this disclosure may be implemented within a communication platform (e.g., a proprietary platform) or/and across multiple communication platforms (e.g., proprietary platforms and third-party platforms).

Particular embodiments of the system provide an advantageous technical solution for communication platforms to attest authenticity and allow a common unidirectional attestation framework to be applied across existing networking hardware as well as virtual routers. Particular embodiments of this disclosure may be applicable to, for example, but not limited to, Cisco Secure Boot, Linux Integrity Measurement Architecture (IMA), Intel's Trusted Execution Technology (TXT), etc., and may enable these platforms to validate that a processor is running known software with valid chain of binary signatures. Particular embodiments of the system may provide defining requirements for the placement of different types of signed measurements (e.g., token or stamps) while allowing receivers to evaluate potential trustworthiness of attested information. Particular embodiments of the system may support controller-based evaluation of signed measurement (e.g., token or stamps) which includes subscription-based mechanisms to incrementally push information/evidence to be verified or/and beachhead use cases and platforms.

TPM functionality may be embedded in a wide variety of devices including mobile phones, PCs, routers, etc. While traditional TPM methods may enable a device to prove freshness in a replay to a response, these methods may not support unidirectional attestation. Particular embodiments of this disclosure may provide mechanisms for verifiable unidirectional attestation by creating and distributing a token. This token may link counters on an attesting device with one or more globally verifiable characteristics or parameters (e.g., a counter on a controller, a RADIUS server, or a time authority). Upon its creation, the token may be distributed freely to any number of receivers/verifiers. Upon receiving the token, a receiver may accept subsequently attested information (e.g., stamps) from a remote TPM and attest asynchronous push, multicast, or broadcast communications of a device. It is notable that, in this disclosure, the term "TPM" may be used as an umbrella term for the necessary functionality. The mechanisms described may be supported by one or more proprietary hardware and other hardware supporting the TPMv2 specification.

In particular embodiments, the system may create the initial token by extracting current counters from an attestee's TPM (e.g., either the local network element 120 or another network element 120), and hashing it with information from an external TPM. As a result, the system may generate a non-spoofable token which binds continuously incrementing counters on an attestee with some known external state. In particular embodiments, any resetting of the TPM counters may be visible in any subsequent TPM queries. Any restarting of platform may be exposed in subsequent TPM queries. Within these bounds of reset and restart, the TPM's counter time-tick may keep continuous increments. Therefore, the push of attestee TPM information which includes these three counters may be known to have occurred subsequently to any previously received measurement. On the other hand, if the reset and restart counters have not changed, the incremental time since any previous measurement may also be known. In particular embodiments, the system may validate device information asserted from outside the TPM's program configuration registers (PCR). The majority of information needing to be trusted by network peers may not be contained within the TPM's PCR. Particular embodiments of the system may provide indirect methods of validating that a device has not been compromised based on the data or processes of exiting systems or platforms.

Particular embodiments of the system may provide integration solutions with both STO's integrity verification (IV) solution and, where applicable, integrity measurement architecture (IMA). The system may provide combination solutions that enable validating that acceptable binaries are currently loaded on a peer communication system or platform. Particular embodiments of the system may allow the receiver to receive stamps and verify the information without supplementary evidence being sent with the stamp. For non-controller-based implementations, the system may not require that the verification steps occur on the receiver.

A network may only be a secure as its weakest links. Information sent from a first device to a second device on the network may pass through multiple intermediary nodes or devices (e.g., routers, network controllers, etc.) before it reaches the target device. It is vitally important that said information, especially when it includes sensitive material, should not be sent through compromised network nodes (e.g., hacked or captured nodes) to prevent leakage of or tampering with the sensitive information. However, as network size and complexity increase, the potential number of attack vectors for an attacker to exploit also grows. It may be difficult to determine with certainty whether each individual node through which an arbitrary piece of information may pass is secured without having a dramatic effect on the performance of the network. Moreover, if an attacker gains root access to a device (e.g., via some previously undetected exploit), traditional protections and link (e.g., in-transit) encryption may prove ineffectual at protecting any sensitive information.

Particular embodiments may apply attestation in the context of security management at a network-level to determine in real-time whether a node in a network should be trusted. This disclosure introduces an asynchronous, unidirectional time-based variant of attestation that may allow other nodes in a network to reliably ascertain if a source that is routing information has been compromised. As previously discussed, the token used in this variant of attestation may be referred to as a "canary stamp" as it positively marks data as it transitions through the network and can indicate on a front-line basis whether any security problems may exist within the network or within a given node.

In particular embodiments, a network element 120 may be configured to validate attestation 160 received from other network elements 120. The receiving network element 120 may be further configured to take action based on the status of the validation according to a specified policy provided to the network node. As an example, network element 120f may validate a canary stamp received in a BGP signaling message 150 from a neighboring network element 120a. The canary stamp may fail the validation and network element 120f may determine to refuse to acknowledge the neighboring network element 120a, as it has determined that it is not trustworthy (e.g., it may be executing unexpected or unsigned code, or it may otherwise show evidence of tampering). Network element 120f may further advertise that it has determined that the neighboring network element 120a is not trustworthy. This may reduce the likelihood of other nodes in the network sending sensitive information to the untrustworthy neighboring network element 120a.

In particular embodiments, a network element 120 such as network element 120f may compute a trust level for a network element 120 based on a received attestation token. As an example and not by way of limitation, network element 120f may set a maximum value to the trust level for network element 120a if it determined that the attestation token for network element 120a is valid at the current time. As another example and not by way of limitation, network element 120f may set a minimum value to the trust level for network element 120a if it determined that the attestation token for network element 120a is not valid at the current time. Although this disclosure describes computing a trust level in a particular manner, this disclosure contemplates computing a trust level for a link in any suitable manner.

FIG. 4 illustrates an example method 400 for applying attestation to BGP. In some embodiments, method 400 may be performed by any apparatus of a BGP network such as network element 120. Method 400 may begin at step 410 where an attestation token for the apparatus is received or otherwise accessed. In some embodiments, the attestation token may be attestation 160 as described herein. In some embodiments, the attestation token is generated by a cryptoprocessor of the apparatus and is accessed in step 410 from one or more memory devices of the apparatus.

At step 420, method 400 encodes the attestation token accessed in step 410 in a BGP signaling message. In some embodiments, the BGP signaling message is a BGP keepalive message and step 420 includes appending the attestation token to the BGP keepalive message after a type field of the BGP keepalive message. In some embodiments, the BGP signaling message is a BGP update message and step 420 includes appending the attestation token to the BGP update message in an attribute field of the BGP update message.

At step 430, method 400 sends the BGP signaling message with the encoded attestation token to second apparatus of the BGP network. The second apparatus may be any appropriate BGP-enabled network element such as an external peer network element. After step 430, method 400 may end.

In some embodiments, a new BGP trust capability (i.e., capability for supporting attestation 160) is negotiated in a BGP open message 150a during session establishment and prior to step 410 above. Based on local router policy, the BGP session may be terminated with a proper notification message if the trust capability is not properly received in an open message. If both peers negotiate the new BGP trust capability for attestation 160, the attestation 160 provided by the trusted computing module of the local router may be appended to a BGP signaling message (e.g., a BGP periodic keepalive message 150d) as described in method 400 above. As illustrated in FIG. 3B, the length of the keepalive messages may be modified as 19 octets plus the length of attestation 160.

In some embodiments, the new BGP trust capability is sent in an optional capability parameter of a BGP open message. In these embodiments, the capability code of the open message may be assigned by IANA. In some embodiments, the capability length may be 1 octet.

In some embodiments, a new BGP trust attribute may be defined in order to apply attestation to BGP. In general, BGP update messages 150b carry path attributes followed by a list prefixes sharing those attributes. A new BGP attribute may be defined in order to carry canary stamps. In these embodiments, the type code may be assigned by IANA and the value is a set of Type-Length-Value (LV) triplets. In a first example, a router ID type for trusted peering may include a value that is the router ID of the speaker followed by attestation 160. In this example, a first router and a second router attest and validate the trustworthiness of updates by attaching canary stamps in all updates in the router ID TLV of the BGP trust attribute. In a second example, a next hop type TLV/MP reach type TLV is used for a trusted next hop. In this example, the value is the router ID of the speaker updating the next hop followed by attestation 160. If a first router sets the next hop to itself, the first router updates the canary stamp in the next hop TLV of the BGP trust attribute and a second router validates the canary stamp if it uses the next hop in forwarding. The second router does not update the canary stamp of the next hop TLV if it is not modifying the next hop. A third router executes the same procedure as the second router. In a third example, a cluster list type TLV is used for trusted reflection. In this example, the value is an ordered list (router IDs, canary stamp). The order matches the cluster list attribute prepend by various speakers during reflection.

In some embodiments, after step 430 above, the receiver of the BGP signaling message transmitted in step 430 of method 400 (e.g., BGP periodic keepalive message 150d) may read the appended attestation 160 based on the length and then validate the attestation 160 with its trusted compute module in order to ascertain the trustworthiness of the peer that transmitted the BOP signaling message. If the peer is found to be compromised, then based on the local policy, the BGP session can be terminated with a proper notification message.

In some embodiments, method 400 may additionally include attaching, during a typical BGP update generation, the attestation 160 provided by the trusted computing module of local router as a BGP trust attribute and advertising the attestation in a prefix advertisement. In these embodiments, the receiving network element speaker may first recognize the BGP trust attribute and then validate the attestation 160 with its trusted computing module in order to ascertain the trustworthiness of the advertisements. In addition, the BGP best path selection may be modified to prefer the trusted path and further advertisement to peers.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for applying attestation to BGP including the particular steps of the method of FIG. 4, this disclosure contemplates any suitable method for applying attestation to BGP including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a had disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these I/O. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN)(such as, for example, a BLUETOOTH (WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PC) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HH-Ds), optical discs, optical disc drives (ODDs), magneto-optical discs, magneto-optical drives, floppy diskettes, floppy disk drives (FDDs), magnetic tapes, solid-state drives (SSDs) RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. An apparatus of a Border Gateway Protocol (BGP) network, the apparatus comprising:
   one or more processors;
   a crypto-processor associated with internal counters, and configured to:
   attest an attestation token to an identity of the apparatus and one or more running binaries corresponding to a valid chain of binary signatures on the apparatus to indicate that the apparatus is in a known safe state, wherein the attestation token is asynchronous and a unidirectional time-based variant; and
   wherein the attestation token enables peer devices in the BGP network to validate that the apparatus is in the known safe state at a current time based on a state of the internal counters via the attestation token; and
   one or more computer-readable non-transitory storage media coupled to the one or more processors and comprising instructions operable when executed by the one or more processors to cause the one or more processors to perform operations comprising:
   accessing the attestation token for the apparatus, wherein:
   the attestation token is generated by the crypto-processor of the apparatus; and the attestation token enables the peer devices in the BGP network to validate that the apparatus is in the known safe state at the current time, wherein the known safe state is based on the identity of the apparatus and the one or more running binaries corresponding to the valid chain of binary signatures on the apparatus;
   encoding the attestation token as a canary stamp in a BGP signaling message, wherein the encoding comprises: appending the canary stamp to the BGP signaling message; and sending the BGP signaling message with the encoded attestation token to a second apparatus of the BGP network for computing a trust level of the apparatus; and
   computing a routing table of the BGP network using the trust level, wherein the routing table is updated based on the attestation token.

2. The apparatus of claim 1, wherein the apparatus of the BGP network comprises a router.

3. The apparatus of claim 1, wherein the BGP signaling message comprises a BGP keepalive message.

4. The apparatus of claim 3, wherein encoding the attestation token in the BGP signaling message comprises appending the attestation token to the BGP keepalive message after a type field of the BGP keepalive message.

5. The apparatus of claim 1, wherein the BGP signaling message comprises a BGP update message.

6. The apparatus of claim 5, wherein encoding the attestation token in the BGP signaling message comprises appending the attestation token to the BGP update message in an attribute field of the BGP update message.

7. The apparatus of claim 1, wherein the attestation token further indicates whether or not valid binary processes are running on the apparatus.

8. A method by an apparatus of a Border Gateway Protocol (BGP) network, the method comprising:
   accessing an attestation token for the apparatus, wherein:
   the attestation token is generated by a crypto-processor of the apparatus, the crypto-processor is associated with internal counters, and configured to:
   attest an attestation token to an identity of the apparatus and one or more running binaries corresponding to a valid chain of binary signatures on the apparatus to indicate that the apparatus is in a known safe state,
   wherein the attestation token is asynchronous and a unidirectional time-based variant; and
   wherein the attestation token enables peer devices in the BGP network to validate that the apparatus is in the known safe state at a current time based on a state of the internal counters via the attestation token; and the attestation token enables the peer devices in the BGP network to validate that the apparatus is in a known safe state at the current time, wherein the known safe state is based on an identity of the apparatus and one or more running binaries corresponding to the valid chain of binary signatures on the apparatus;
   encoding the attestation token as a canary stamp in a BGP signaling message wherein the encoding comprises: appending the canary stamp to the BGP signaling message; and sending the BGP signaling message with the encoded attestation token to a second apparatus of the BGP network for computing a trust level of the apparatus; and
   computing a routing table of the BGP network using the trust level, wherein the routing table is updated based on the attestation token.

9. The method of claim 8, wherein the apparatus of the BGP network comprises a router.

10. The method of claim 8, wherein the BGP signaling message comprises a BGP keepalive message.

11. The method of claim 10, wherein encoding the attestation token in the BGP signaling message comprises appending the attestation token to the BGP keepalive message after a type field of the BGP keepalive message.

12. The method of claim 8, wherein the BGP signaling message comprises a BGP update message.

13. The method of claim 12, wherein encoding the attestation token in the BGP signaling message comprises appending the attestation token to the BGP update message in an attribute field of the BGP update message.

14. One or more computer-readable non-transitory storage media embodying software that is operable when executed to:
- access an attestation token for an apparatus of a Border Gateway Protocol (BGP) network, wherein:
- the attestation token is generated by a crypto-processor of the apparatus the crypto-processor is associated with internal counters, and configured to:
- attest an attestation token to an identity of the apparatus and one or more running binaries corresponding to a valid chain of binary signatures on the apparatus to indicate that the apparatus is in a known safe state, wherein the attestation token is asynchronous and a unidirectional time-based variant; and
- wherein the attestation token enables peer devices in the BGP network to validate that the apparatus is in the known safe state at a current time based on a state of the internal counters via the attestation token; and
- the attestation token enables the peer devices in the BGP network to validate that the apparatus is in a known safe state at the current time, wherein the known safe state is based on an identity of the apparatus and one or more running binaries corresponding to the valid chain of binary signatures on the apparatus;
- encode the attestation token as a canary stamp in a BGP signaling message wherein the encoding comprises: appending the canary stamp to the BGP signaling message; and sending the BGP signaling message with the encoded attestation token to a second apparatus of the BGP network for computing a trust level of the apparatus; and
- compute a routing table of the BGP network using the trust level, wherein the routing table is updated based on the attestation token.

15. The one or more computer-readable non-transitory storage media of claim 14, wherein the BGP signaling message comprises a BGP keepalive message.

16. The one or more computer-readable non-transitory storage media of claim 15, wherein encoding the attestation token in the BGP signaling message comprises appending the attestation token to the BGP keepalive message after a type field of the BGP keepalive message.

17. The one or more computer-readable non-transitory storage media of claim 14, wherein the BGP signaling message comprises a BGP update message.

18. The one or more computer-readable non-transitory storage media of claim 17, wherein encoding the attestation token in the BGP signaling message comprises appending the attestation token to the BGP update message in an attribute field of the BGP update message.

* * * * *